CONTROL ROD FOR VEHICLE DIMMER LIGHT SWITCH

Filed April 4, 1961

INVENTOR.
Alphia K. Gunter, Sr.
BY
Victor J. Evans & Co.
Attorneys

United States Patent Office 3,103,130

Patented Sept. 10, 1963

1

3,103,130
CONTROL ROD FOR VEHICLE DIMMER LIGHT SWITCH

Alphia K. Gunter, Sr., 205 N. Layton Ave., Dunn, N.C.,
Filed Apr. 4, 1961, Ser. No. 100,562
1 Claim. (Cl. 74—481)

This invention relates to a control rod for a vehicle dimmer light switch.

The object of the invention is to provide a control rod or unit for a vehicle dimmer light switch wherein the dimmer light switch can be manually actuated when desired or required.

A further object is to provide a vehicle dimmer light switch control unit of the type stated which can either be manually operated or else foot pressure can be applied thereto in order to operate the switch as for example when the vehicle lights are to be dimmed or turned up to bright light position, and wherein the hand operated dimmer device of the present invention is also adapted to be used by short people or crippled persons who are unable to easily and comfortably reach the floor dimmer switch.

Still another object is to provide a vehicle accessory which consists of a dimmer light switch control unit that can be conveniently used for changing vehicle or automobile lights from bright to dim or vice-versa as for example by a person who does not have use of their legs, since with the present invention the dimmer light switch can be actuated manually instead of requiring foot pressure to actuate or operate the same.

Still another object is to provide such a dimmer light switch control that is economical to manufacture and efficient in operation and which is operable by one hand of the operator and which is rugged in structure and foolproof in use.

These and other objects of the invention will become apparent from a reading of the following specification and claims, together with the accompanying drawings, wherein like parts are referred to and indicated by like reference characters and wherein:

Figures 1, 2, 3, 4, 5, 6:
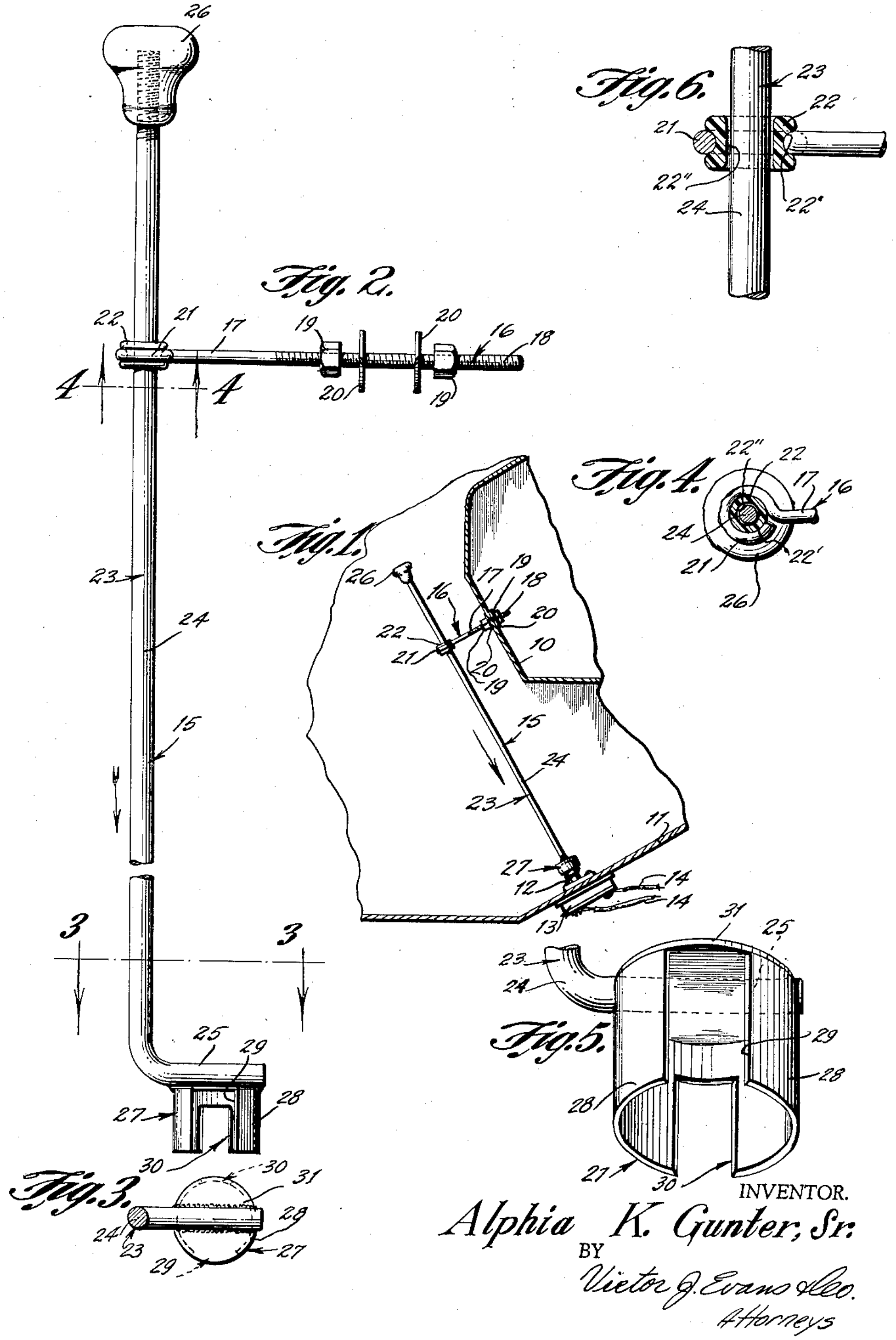
FIGURE 1 is a fragmentary sectional view showing the dimmer light switch control unit of the present invention mounted in a portion of a vehicle.
FIGURE 2 is an enlarged elevational view illustrating the dimmer light switch control per se of the present invention.
FIGURE 3 is a sectional view taken on the line 3—3 of FIGURE 2.
FIGURE 4 is a sectional view taken on the line 4—4 of FIGURE 2.
FIGURE 5 is an enlarged fragmentary perspective view showing the cup on the lower end of the rod that is adapted to engage the dimmer light switch.
FIGURE 6 is an enlarged fragmentary sectional view showing certain constructional details of the present invention.

Referring in detail to the drawings, the numeral 10 indicates a portion of a vehicle dash panel or instrument panel, while the numeral 11 indicates a portion of a vehicle floor board, FIGURE 1, and arranged on the floor board 11 is the usual dimmer light switch or button 12 which is adapted to be depressed in order to actuate the dimmer light switch 13, and the switch 13 is adapted to be electrically connected to the vehicle head lights in the usual manner as for example by means of the wires or conductors 14.

According to the present invention there is provided a control unit for the dimmer light switch, and this control unit is indicated generally by the numeral 15. The control unit 15 embodies a securing element 16 which includes a shank 17 that is adapted to extend through a suitable opening or aperture in the dash 10, and the shank 17 is provided with a threaded portion 18, FIGURE 2. The fasteners or nuts 19 are arranged in threaded engagement with the threaded portion 18, and washers 20 are mounted on the shank 17, and these and the pair of washers 20 are arranged on opposite sides of the dash 10 so that by tightening the pair of nuts 19 the securing element 16 can be maintained securely clamped or fastened to the dash 10. There is formed or provided on one end of the securing element 16 an eye portion 21 for a purpose to be later described.

The numeral 22 indicates a bushing which is fixedly mounted within the eye portion 21 of the securing element 16, and the bushing 22 may be made of a suitable material such as a suitable plastic. The bushing 22 is adapted to be provided with an outer annular groove 22' which receives the eye portion 21, and the bushing is further provided with a central bore or opening 22'', and the numeral 23 indicates a rod which includes a main body portion 24 that is slidable in the bore 22'' of the bushing 22. The main body portion 24 is of straight formation, and the rod 23 further includes a transverse lower end portion 25 which is arranged at right angles with respect to the straight portion 24, and a hand knob or handle 26 is suitably affixed to the upper end of the rod 23 as for example as shown in FIGURE 2.

The numeral 27 indicates a cup which is secured to or formed integral with the transverse lower end portion 25, and the cup 27 depends from the transverse portion 25, the cup 27 adapted to firmly engage the button 12 of the dimmer light switch 13. The cup 27 is shaped to include an arcuate side wall portion 28 as well as a top wall portion 31 which may be secured as by welding to the transverse portion 25, and the side wall portion 28 may be recessed or cut away as at 29 and 30 to provide sufficient clearance for the adjacent portions of the dimmer light switch assembly.

From the foregoing, it is apparent that there has been provided a control unit which is especially suitable for use with a vehicle dimmer light switch and, by means of the present invention the vehicle or automobile head lights can be manually dimmed or turned on to the bright position so that it is not necessary to operate the lights by foot pressure. Ordinarily the vehicle lights are dimmed or turned to the bright position as desired or required by applying foot pressure to the conventional dimmer light switch button 12 whereby the switch 13 will actuate the vehicle head lights through the medium of the electric wires or conductors 14. Under certain conditions it is not practical or advisable to actuate the dimmer light switch by foot pressure as for example a crippled person or a short person may have difficulty applying foot pressure to the light switch button 12. According to the present invention the control unit 15 is mounted and located as shown in the drawing so that by manually gripping the knob 26 and pushing down on the rod 23, the button 12 will be moved downwardly in order to actuate or energize the switch 13.

It is to be noted that according to the present invention the securing element or eye bolt 16 is adapted to have its shank 17 extended through a suitable opening in the dash 10, and the washers 20 are arranged on opposite sides of the dash 10, and the nuts 19 are adapted to be tightened on the threaded portion 18 so as to maintain the securing element or bolt 17 fixedly mounted in place in the dash 10. The securing element 16 is provided with the eye portion 21 on one end thereof and the bushing 22 is firmly held in the eye portion 21. The rod 23 has its straight portion 24 slidable in the bore 22'' of the sleeve 22, and the rod 23 includes the transverse lower portion 25 which has the cup 27 affixed thereto so that when the rod 23 is manually moved as for example by means of a knob 26, the cup 27 will similarly be moved, and since the cup 27 is firmly engaged with the button 12 of the dimmer switch 13, it will be seen that this manual movement of the rod 23 will result in corresponding movement of the dimmer button 12 so as to turn the vehicle head lights to the bright or dim position as desired or required.

In addition, it is to be noted that the transverse portion 25 is arranged at right angles with respect to the straight portion 24, and this transverse portion 25 is adapted to be conveniently engaged by the driver's foot as for example if it is desired to operate the dimmer switch by foot pressure instead of by hand pressure so that with the present invention the control unit provides a means whereby the dimmer switch can either be manually actuated or else foot pressure can be used for actuating or energizing the same.

The parts can be made of any suitable material and in different shapes or sizes.

Some operators or drivers of vehicles have felt that present day vehicles are already equipped or provided with too many foot pedals for different purposes, and with the present invention the foot pedal or foot operated dimmer switch can be converted to a hand operation which will be advantageous to some drivers. The present invention is thus an accessory for a vehicle such as an automobile which can be used for changing the automobile lights from bright to dim or vice-versa as for example by people who do not have the use of their legs. For example a person who without a left leg cannot now operate the dimmer switch conveniently and with the present invention the dimmer can be operated by hand so that increased safety will be provided in such situations. In addition short people, crippled people or the like who are unable to easily and comfortably reach the floor dimmer switch will find the present invention useful and helpful.

The parts can be adjusted so that they will be in a desired location and the parts can be tightened in order to prevent accidental movement thereof. The bushing 22 prevents the rod 23 from rattling in the eye portion 21. The cap or cup 27 is constructed so that it will snugly fit down over the top or button 12 of the floor dimmer switch 13. The securing element 16 has it shank threaded substantially throughout its entire length so as to provide or permit adjustment to the contour of the dash.

The present invention thus provides an accessory which will permit a vehicle to be operated wit hincreased safety and convenience especially by persons who are not able to easily and comfortably reach the floor dimmer switch. The present invention will not interfere with the normal operation of the foot dimmer, and in addition the hand dimmer rod 23 acts or functions as a guide for the foot in the dark if one desires to use the foot to operate the dimmer, so that the present invention gives the driver two methods for controlling or operating the head lights beam instead of only one which greatly increase the safety of night driving. The hand dimmer is a simple and ruggedly constructed unit which can be readily attached and which requires no change in the location of the foot dimmer that is presently on vehicles.

To attach the hand dimmer, the cup 27 is placed over the foot dimmer switch button 12 with the opened side of the cup down, and the rod 23 and bushing 22 and securing element 16 are assembled together as shown in the drawings, and if there is no opening in the dash, a suitable opening such as a quarter inch opening or hole is made in the dash to receive or accommodate the shank 17, and the securing element is adjusted so that eye portion 21 is properly located to permit the cup to sit down on the foot dimmer switch button and permit the rod 23 to properly and freely operate. The nuts 19 and washers 20 are applied and adjusted to the proper position and then the nuts can be tightened. The function of the securing element 16 is to support the dimmer rod 23 in its proper location. The bushing 22 which may be made of plastic or the like prevents rattling of the rod 23 in the eye portion 21. The entire unit can be readily assembled or disassembled without requiring any special skill or without requiring any complicated tools.

The member 22 may consist of a flanged plastic bushing which has a hole in the center thereof for the control rod 23 to be slidable therethrough, and the flanged plastic bushing 22 is fixedly mounted and held firmly in the eye portion 21 of the securing element 16. The bushing is constructed so that its flanges or shoulders maintain the bushing firmly and securely in the eye portion 21 of the securing element 16.

The purpose of the cut outs such as the cut outs 29 and 30 in the cup 27 is to allow the cup to be slightly expanded or contracted so as to fit the cup snugly to the button of the dimmer light switch since for example the button might vary slightly in diameter. The cut out 29 extends to the top of the cup so as to allow a screw driver or other sharp tool to be inserted between the cup and dimmer button for removal of the cup if necessary or desired.

Minor changes in shape, size and rearrangement of details coming within the field of invention claimed may be resorted to in actual practice, if desired.

What is claimed is:

In a vehicle dimmer light switch control unit including a rod, hand grip means on one end of said rod, and a transverse portion on the other end of said rod arranged at a right angle to the main body of said rod, an inverted cup depending from said transverse portion, said cup having a first cutout portion extending from the lip thereof to a point spaced from the bottom thereof, and said cup having a second cutout portion diametrically opposed to said first cutout portion, said second cutout portion extending from the lip to the bottom, said cup being adapted to slidably receive therein the floor mounted button of a dimmer light switch, said second cutout portion being adapted to receive therethrough the end portion of a tool for prying said cup off said button after receiving the button therein.

References Cited in the file of this patent

UNITED STATES PATENTS

| | | |
|---|---|---|
| 1,425,586 | Gilbert | Aug. 15, 1922 |
| 1,517,116 | Hank | Nov. 25, 1924 |
| 1,543,284 | Ford | June 23, 1925 |
| 1,692,883 | Bennett | Nov. 27, 1928 |
| 1,769,191 | Russell et al. | July 1, 1930 |
| 1,812,352 | McCurdy | June 30, 1931 |
| 2,969,691 | Cherry | Jan. 31, 1961 |